United States Patent [19]

Nakamura

[11] Patent Number: 4,744,673

[45] Date of Patent: May 17, 1988

[54] PACKAGING BAG

[75] Inventor: Toshio Nakamura, Osaka, Japan

[73] Assignee: Nakamura Seitai Co., Ltd., Osaka, Japan

[21] Appl. No.: 921,283

[22] PCT Filed: Mar. 7, 1986

[86] PCT No.: PCT/JP86/00117

§ 371 Date: Nov. 7, 1986

§ 102(e) Date: Nov. 7, 1986

[87] PCT Pub. No.: WO86/05162

PCT Pub. Date: Sep. 12, 1986

[30] Foreign Application Priority Data

Mar. 18, 1985 [JP] Japan .................................. 60-55444

Mar. 8, 1986 [JP] Japan .................................. 60-47065

[51] Int. Cl.[4] ............................................. G06K 9/68

[52] U.S. Cl. ........................................ 383/38; 383/39; 383/40

[58] Field of Search ........................ 383/38, 39, 40, 41, 383/63

[56] References Cited

U.S. PATENT DOCUMENTS 3,224,640 12/1965 Schneider et al. .................... 383/38

3,608,566 9/1971 Storandt ................................ 383/38

3,746,215 7/1973 Ausnit et al. .......................... 383/36

3,891,138 6/1975 Glas ....................................... 383/38

3,939,971 2/1976 Tulis ...................................... 383/38

*Primary Examiner*—Willis Little

*Attorney, Agent, or Firm*—Jordan and Hamburg

[57] ABSTRACT

A bag formed of a plastic film used for storing an article as when relatively inexpensive articles are offered free of charge for sales promotion to customers. This bag also has secondary storing chambers, i.e., pockets for storing pamphlets of goods, a description of the article, a business card, etc. The bag is made with a central sheet member and a twofold cover sheet member of the same width as that of the central sheet member, the cover sheet member sandwiching the central sheet member, the three parts, i.e., the central sheet member and the front and back portions of the cover sheet member being fused together along opposite widthwise lateral edges. When the central sheet member is a bag body, and the interior thereof is used as a primary storing chamber and the spaces between the bag body and the cover sheet member are used as secondary storing chambers. When the central sheet member is a sheet, not a bag, the space between this sheet and one of the front and back portions of the cover sheet member is used as a primary storing chamber while the space between this sheet and the other of the front and back portions of the cover sheet member is used as a secondary storing chamber. The fold of the cover sheet member forms the bottom of the primary storing chambers. Since the bottom of the pockets is not formed by a fused portion between the pocket forming sheet and the bag body in this manner, there is no danger of the bottom being broken even when the contents of the pockets are heavy or include an object which is flat and has relatively sharp corners, such as a business card. Further, since such a cover sheet is of the same width as that of the bag body and the bag body and the cover sheet member are fused together along widthwise lateral edges, it is possible to simplify the manufacturing process.

4 Claims, 8 Drawing Sheets

PACKAGING BAG

BACKGROUND OF THE INVENTION

In Japan, makers or sellers often offer customers relatively inexpensive articles free of charge to attract customers' interest in their goods for sales promotion. The same is equally true of bankers competing for depositors.

This invention relates to a packaging bag which can be presented intact with such an article put therein.

However, the invention is not limited in scope to the above, but is also applicable to packaging bags for storing articles for sale or for an exchange of presents between individuals.

The aforesaid bags would be more convenient if information including the way to use the stored goods and the firm name and trademark of the donor could be indicated on the surface of the bag.

However, the area of the bag surface is so limited that sufficient information cannot be printed thereon. It takes substantial time and labor to put a description and the like together with an article in the bag, and in the case where the bag is transparent, this description and the like, if stored in the bag obliquely or face downward, would detract from the appearance.

As a solution to this problem, it may be contemplated to attach a pocket, or a secondary storing chamber, which is capable of storing a business card, a pamphlet, a description of the article and the like. To this end, however, it is necessary to arrange an additional sheet on the surface of the bag body to define a pocket therebetween. This causes two new problems: (1) the manufacturing process becomes complicated, and (2) the bottom of the bag, though composed of the fused portion between the sheet and the bag body, is in danger of being broken if the contents include a heavy object or a hard flat object such as a business card.

Accordingly, this invention is intended to provide a pocket-equipped packaging bag which is easy to manufacture and strong.

SUMMARY OF THE INVENTION

To achieve this object, the present invention provides a packaging bag comprising a central sheet member formed of a plastic sheet, and a twofold cover sheet member of the same width as that of the central sheet member and formed also of a plastic sheet, the cover sheet member sandwiching the central sheet member, the three parts, i.e., the central sheet member and the front and back portions of the cover sheet member being fused together along opposite widthwise lateral edges.

When the central sheet member is a bag body, the interior of the bag body is used as a primary storing chamber and spaces between the bag body and the cover sheet member are used as secondary storing chambers, i.e., pockets. When the central sheet member is not a bag but a sheet, the space between this sheet and one of the front and back portions of the cover sheet member is used as a primary storing chamber while the space between this sheet and the other of the front and back portions of the cover sheet member is used as a secondary storing chamber.

Because of such construction, the fold of the cover sheet member forms the bottom of the secondary storing chamber, i.e., pocket. Since the bottom of the pocket is not formed by the fused portion between the sheet forming the pocket and the bag body, as described above, there is no danger of the bottom being broken even when the contents of the pocket are heavy or include an object which is flat and has relatively sharp corners, such as a business card. Further, since such cover sheet member has the same width as the bag body and the bag body and cover sheet member are fused together along opposite widthwise lateral edges, the manufacturing process can be simplified.

DETAILED DESCRIPTION OF THE PREFERRED EMBODIMENTS

Figure 2:
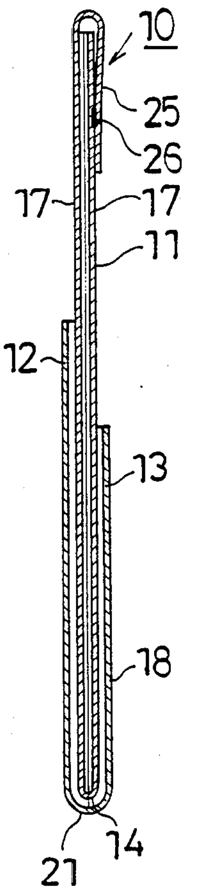
FIG. 2 is a longitudinal sectional view taken along the line II—II in FIG. 1.
Figure 1:
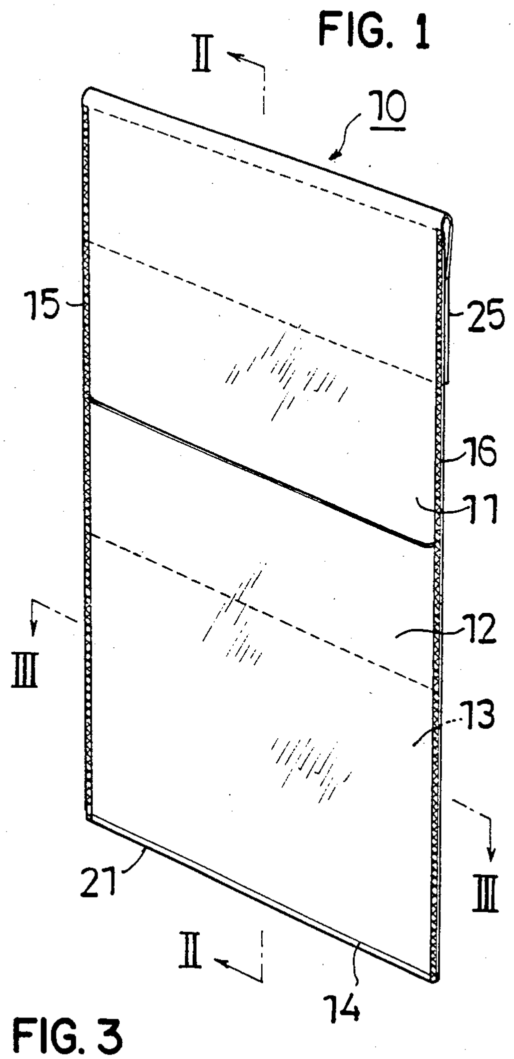
FIG. 1 is a perspective view showing a first embodiment of the present invention.
Figure 3:
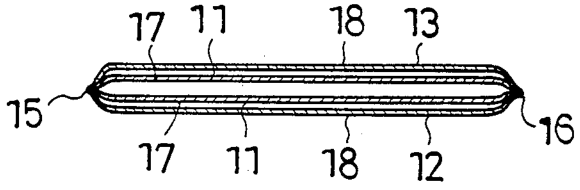
FIG. 3 is a cross-sectional view taken along the line III—III in FIG. 1.

FIGS. 1 through 3 show an embodiment of a packaging bag (10) of the present invention. A bag body (11) formed of a plastic film has attached to the front and back thereof pockets (12) and (13) formed of a transparent plastic film of the same width as that of the bag body. The pockets (12) and (13) are formed of a transparent film (18) folded in two along a bottom (14) of the bag body (11). As shown in FIG. 3, opposite widthwise lateral edges thereof are fused together along with the opposite lateral edges (15) and (16) of the bag body (11).

If the pockets (12) and (13) are formed of a transparent film in this manner, a description or the like printed on the surface of a stored object such as a pamphlet can be seen from the outside and a propaganda effect can be obtained with the pamphlet and the like remaining stored in the pockets.

In this embodiment, the front pocket (12) is longer than the back pocket (13), the front pocket (12) being suitable for storing relatively long objects such as pamphlets and catalogs and the back pocket (13) for storing relatively short objects such as business cards and memos. Though omitted from the illustration, the front and back pockets may be of the same length or the back pocket may be longer, depending upon the length of pamphlets and the way the bag is used. Further, one of the pockets may be made very short. Further, an arrangement wherein only one side of the bag body is provided with a pocket is included in the scope of the invention. That is, in that arrangement, the sheet forming the pocket cooperates with the bag body on one side of the body to form the pocket and on the other side it turns inward a very short distance so that on the other side it does not substantially form a pocket but is simply fused to the bag body.

Figure 4:
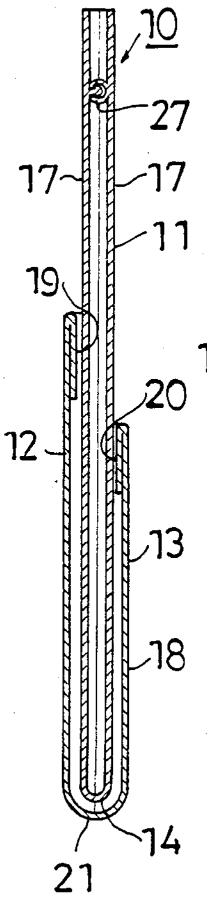
FIG. 4 is a longitudinal sectional view showing a second embodiment.

FIG. 4 shows an example in which upper openings in the pockets (12) and (13) are provided with flaps (19) and (20) turned toward the bag body (11). Thereby, the insertion of pamphlets and the like is facilitated and, furthermore, when objects shorter than the pockets are stored, they will be caught by the flaps (19) and (20) when the bag (10) is turned upside down; thus, the contents are prevented from falling out.

Figure 5:
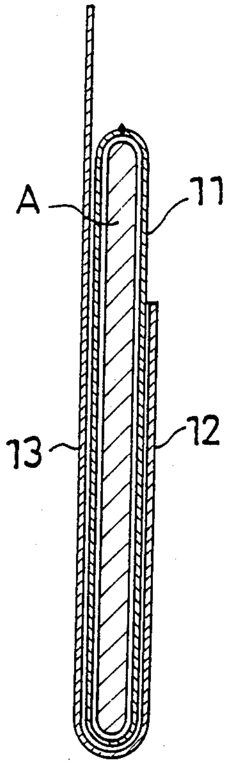
FIG. 5 is a longitudinal sectional view showing a third embodiment.

In an embodiment shown in FIG. 5, the bag body (11) is closed both at the upper end and at the bottom and an article (A) is stored in the inside. This bag can be used, e.g., in the following manner: When a clothes material is to be sold together with a paper pattern, the clothes material is stored in the closed bag body and is thereby protected from being soiled by purchasers touching it with their hands, while the paper pattern is put in the pocket from which it can be easily taken out, and may be replaced by another paper pattern at the purchaser's desire.

Figure 6:
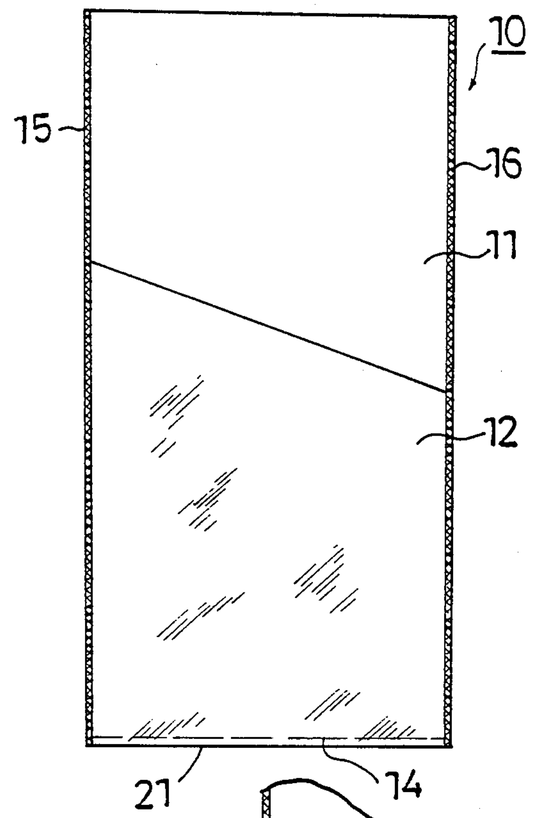
FIG. 6 is a front view of a fourth embodiment.

In FIG. 6, the upper edge of the pocket (12) is biased. It may be made wavy.

Figure 7:
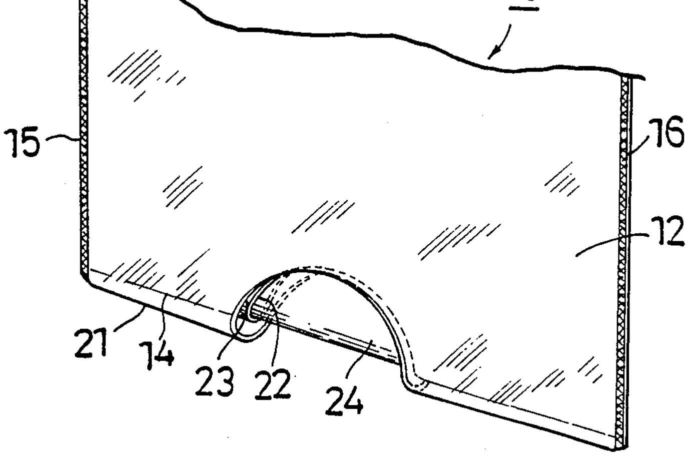
FIG. 7 is a principal perspective view showing a fifth embodiment.

In FIG. 7, semicircular notches (22) and (23) are formed in the bottom (14) of the bag body and the bottom (21) of the pocket. When soft deformable articles such as tissue paper and vinyl bags are stored, they can by drawn out downward through the notches.

The means for closing the upper opening in the bag body is not limited. Usually, various means can be utilized which are used for closing bags formed of plastic films. For example, as shown in FIGS. 1 and 2, the front film portion (17) of the bag body (11) can be made longer than the back film portion (17) to stagger the opening in the bag body to form a tongue (25) projecting from the front film portion, which tongue may be provided with an adhesive agent or adhesive tape for sticking to the back film portion when turned back. In another example, as shown in FIG. 4, a fastener (27) provided on the inner surface of the upper portion of the bag body (11) may be used for closure. Further, such openable closure may be replaced by a fused closure.

When the bag body (11) is formed of a transparent film, the contents can be conveniently seen from the outside.

An example of a method of producing packaging bags of the present invention will now be described.

Figure 8:
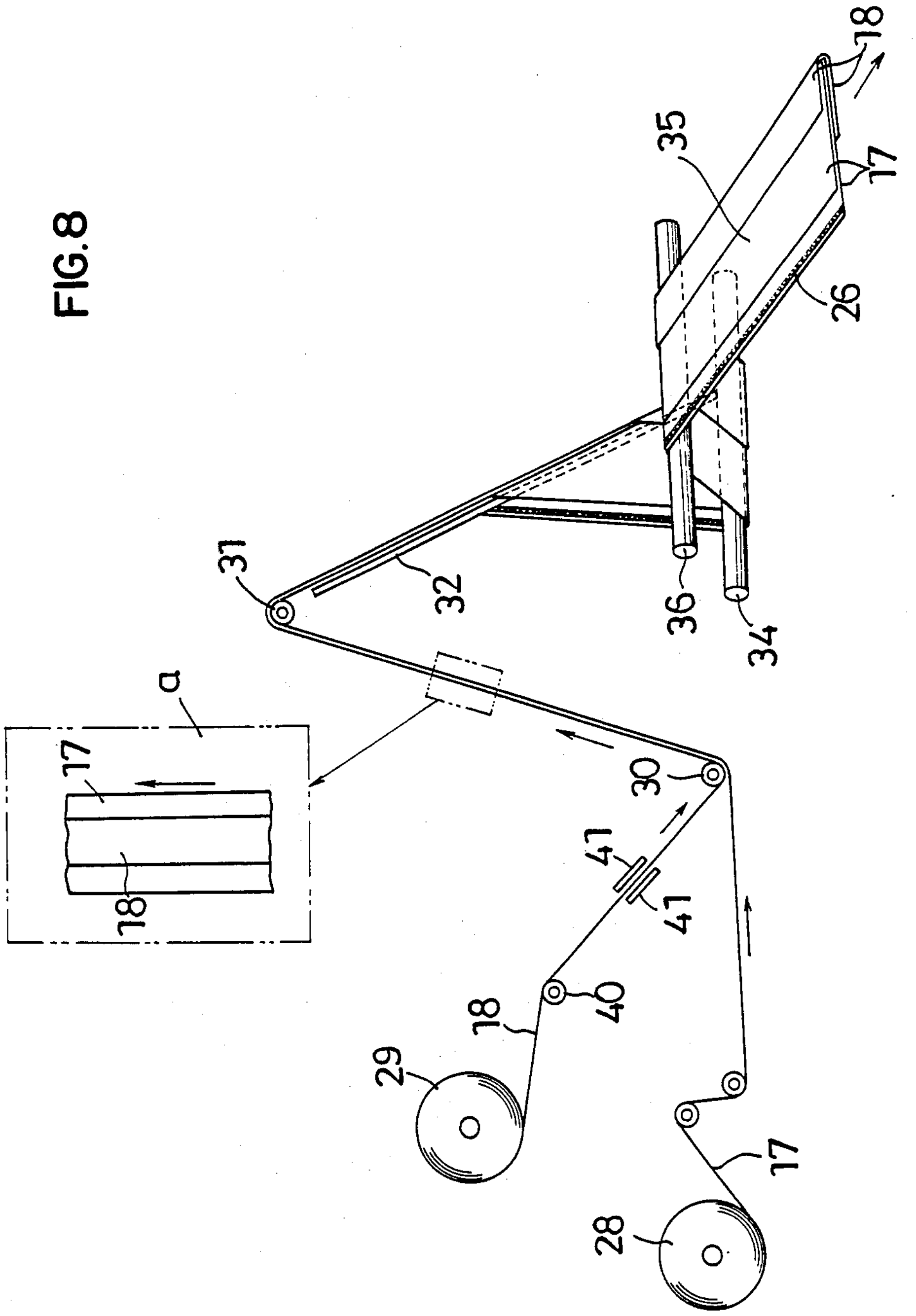
FIGS. 8 and 9 are schematic views showing one method for producing the packaging bags shown in FIGS. 1 through 7, wherein a in FIG. 8 schematically shows the state of overlap between a bag body forming film and a pocket forming film.

In FIG. 8, the numeral (28) denotes a material roll for a plastic film (17) which is the material of the bag body (11), and (29) denotes a material roll for a transparent plastic film (18) which is the material of the pockets (12) and (13). The two raw films (17) and (18) from these rolls meet each other at a direction change roll (30) where they form a double layer which is fed upward. In this state, as shown at a in the figure, the narrow film (18) for forming the front and back of the pockets is placed on the middle of the wide film (17) for forming the front and back of the bag body.

Figure 9:
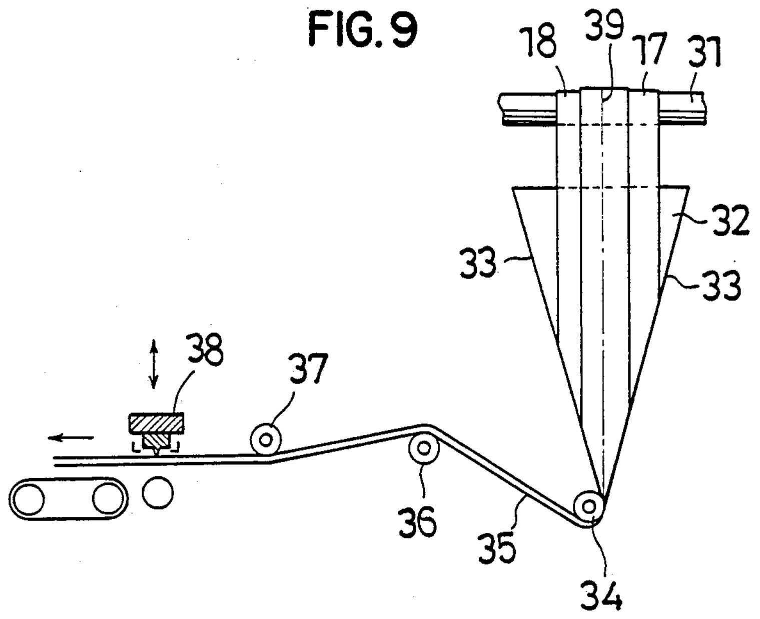

The films (17) and (18) which have overlapped each other in this manner travel downward via a direction change roll (31). In the path of travel of the films (17) and (18) there is a folding guide plate (32). As shown in FIG. 9, since the folding guide plate (32) is in the form of an inverted triangle, the films (17) and (18) are folded along opposite edges (33), (33) of the guide plate (32), so that when passing around a direction change roll (34) at the lower end, they have been completely folded in two, thus forming a four-layer composite film (35).

Figure 10:
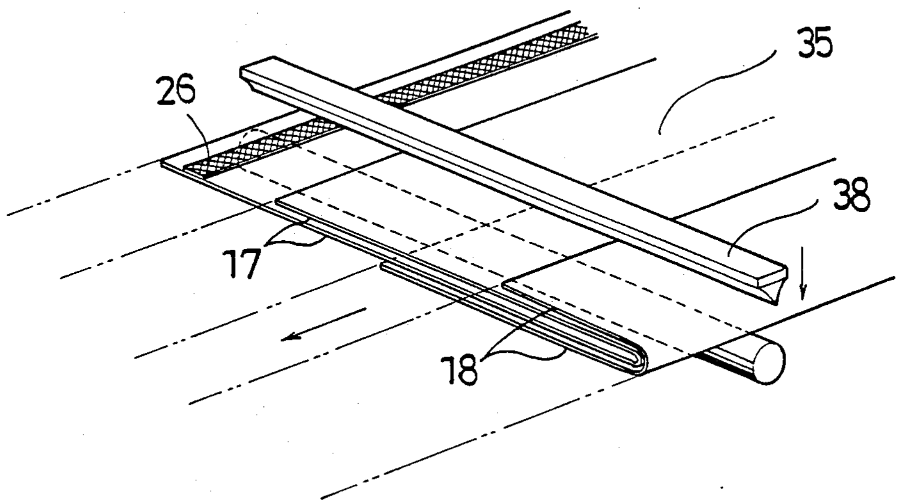
FIG. 10 is a perspective view showing the thermal cutting process of FIG. 9.

Subsequently, the composite film (35) is intermittently fed through a roll (36) and then through a roll (37), as shown in FIG. 9; when it is stopped, it is thermally cut throughout the width by a hot iron (38), as shown in FIG. 10. By means of this thermal cutting operation, composite film (35) is separated to provide a piece having the same width as that of the packaging bag (10) and along the opposite lateral edges the front and back film portions (17), (17) of the bag body are fused together along with the front and back film portions (18), (18) of the pockets.

Instead of simultaneously performing the separation to provide a bag and the fusion along the opposite lateral edges of the bag in this manner, the composite film (35) may, first, be fused together over a wider fusion area at the same location as the aforesaid fused location and then cut through the middle of the fusion area.

In the method shown in FIG. 9, a folding line (39) along which films (17) and (18) are folded in two by the folding guide plate (32) coincides with neither the centerline of the width of the pocket forming film (18) nor the centerline of the width of the bag body forming film (17). That is, in the bag body forming film (17), the portion to the right of folding line (39) (corresponding to the front film portion) is longer than the portion to the left (corresponding to the back film portion) by an amount corresponding to tongue (25), while in the pocket forming film (18), the portion to the right of folding line (39) (corresponding to the front pocket forming film portion) is longer than the portion to the left (corresponding to the back pocket forming film portion). If the widthwise relative positions of the guide plate (32), bag body forming film (17) and pocket forming film (18) are adjusted in this manner, the packaging bag (10) shown in FIGS. 1 and 2 can be produced.

On the other hand, if the centerline of the width of the bag body forming film (17) is adjusted to coincide with folding line (39), the front and back film portions become equal in length to each other, as shown in FIG. 4, while if the centerline of the width of the pocket forming film (18) is adjusted to coincide with folding line (39), the front and back pockets (12) and (13) become equal in length, though not shown.

In addition, when it is desired to form flaps (19) and (20) on the pockets (12) and (13) as in the packaging bag (10) of FIG. 4, this can be attained by providing a folding roll (40) narrower than the pocket forming film (18) and drive-in strips (41) for holding the film (18) therebetween from vertically opposite sides. That is, the pocket forming film (18) delivered from the material roll (29) passes over the folding roll (40) when, since the axial length of the folding roll (40) is smaller than the width of the film (18), the opposite lateral edges of the film (18) project a predetermined distance beyond the roll

(40) and are bent. The bent portions are folded by the drive-in strips (41), whereby the flaps (19) and (20) are formed. When it is desired to form a flap on either one of the pockets (12) and (13), this can be attained by adjusting the axial relative positions of the material roll (29) and the folding roll (40) in such a manner that only one lateral edge of the pocket forming film (18) projects beyond the folding roll (40).

In the method shown in FIGS. 8 through 10, though omitted from the illustration, a release film is applied to the adhesive-applied region of the bag body forming film (17) and in this state the packaging bag (10) is formed; in use, this release film will be peeled off to close the top opening in the bag body.

In an arrangement wherein a fastener (27) is used for closure as in the packaging bag shown in FIG. 4, a film provided along opposite sides thereof with a ridge and a groove which are adapted to fit together may be used as the bag body forming film (17).

In addition, instead of thermally cutting the composite film (35) in the final stage of the process, though omitted from the illustration, the bag body forming film (17) and the pocket forming film (18) may be cut to the same width, placed one on the other, folded in two, and fused together along opposite lateral ends to thereby form a packaging bag.

In the above embodiments, the pockets (12) and (13) have been formed of a transparent film; however, the present invention is not limited thereto. They may be formed of a transparent film having characters, patterns or the like printed thereon or of an opaque film.

Figure 12:
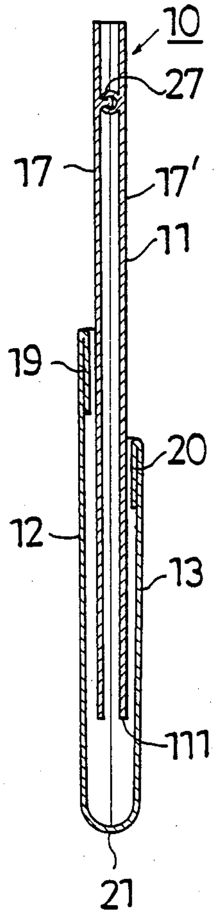
FIG. 12 is a longitudinal sectional view showing a seventh embodiment.
Figure 11:
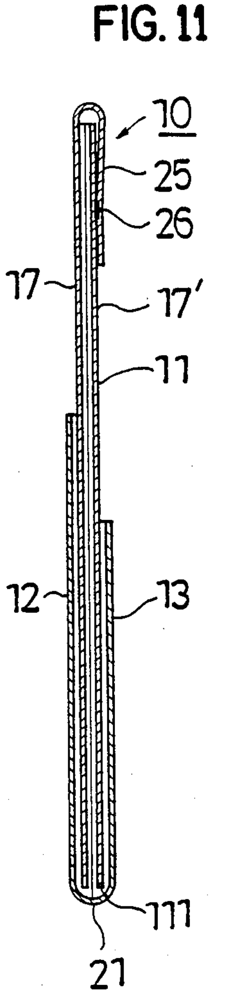
FIG. 11 is a longitudinal sectional view showing a sixth embodiment of the invention.

In FIGS. 11 and 12, another embodiment of the invention is shown, which differs from the preceding embodiments in that the bottom (111) of a bag body (11) is opened. In this case, the position of the bottom may be considerably above the level of the bottom of the pockets. If the pockets and the bag body extend face to face with each other over a substantial length, there will be no possibility of the contents of the bag body slipping out into the pockets.

Figure 13:
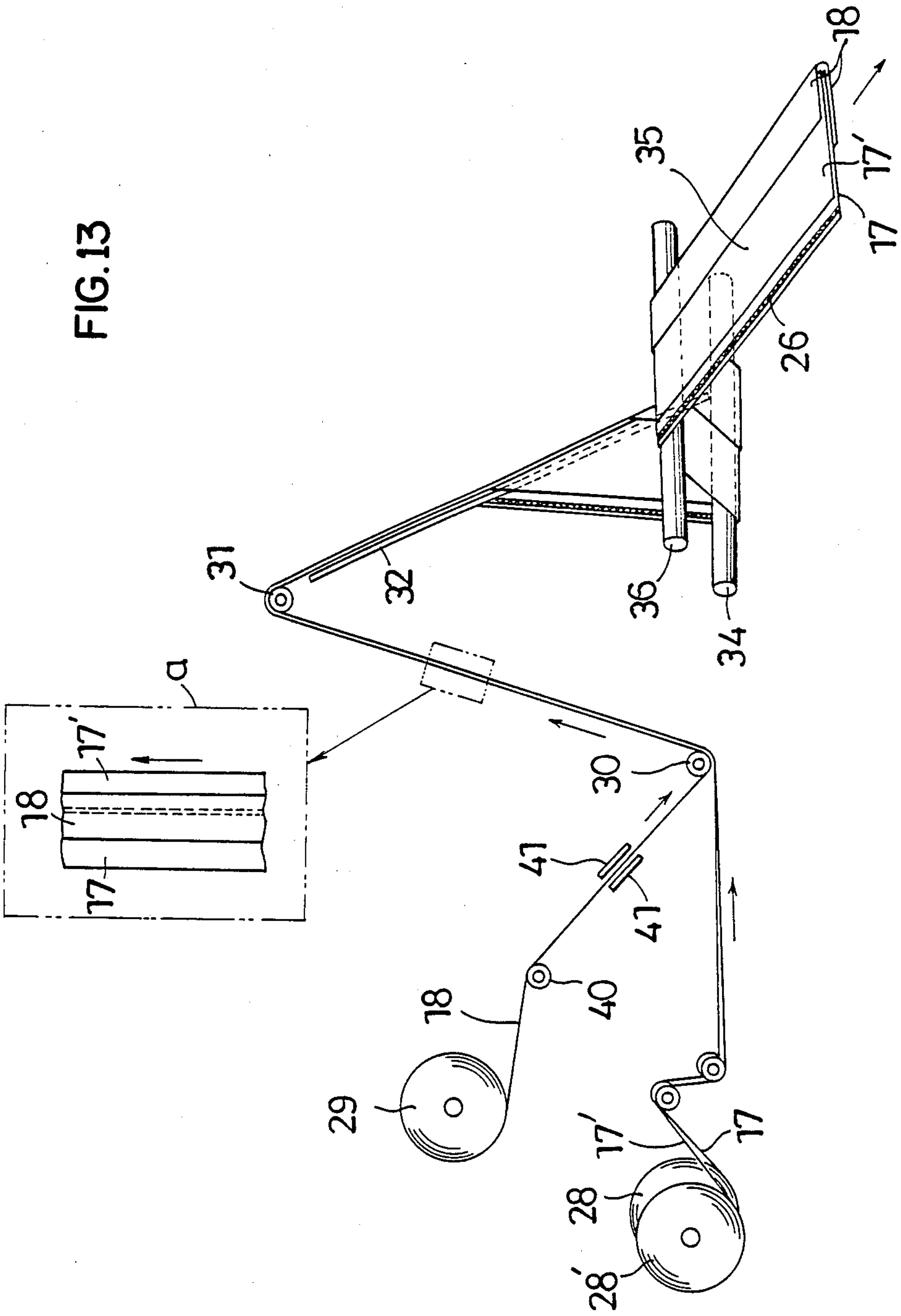
FIGS. 13 and 14 are schematic views similar to FIGS. 8 and 9, showing one method for producing the packaging bags shown in FIGS. 12 and 13.
Figure 14:
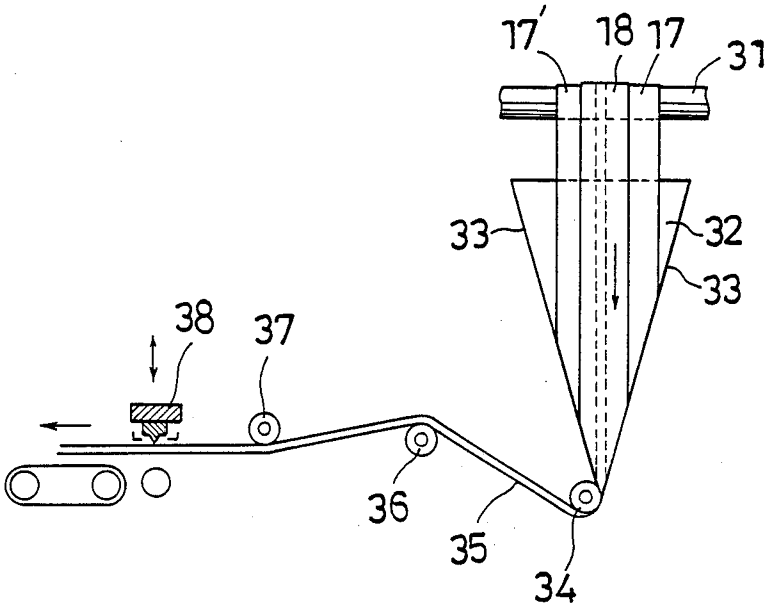

A method of producing the bag of FIGS. 11 and 12 is shown in FIGS. 13 and 14. This method is the same as the one shown in FIG. 8 except that two long films (17) and (17') forming the front and back sheets of the bag body (11) are delivered from two rolls (28) and (28') with a pocket forming film (18) overlapping the two films.

Figure 15:
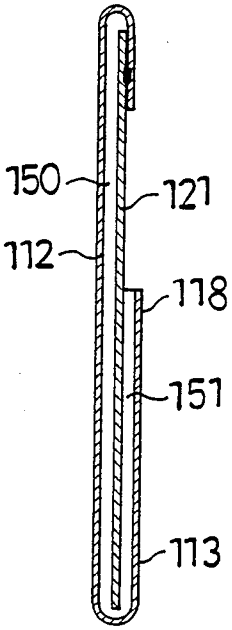
FIG. 15 is a longitudinal sectional view showing an eighth embodiment of the invention.
Figure 16:
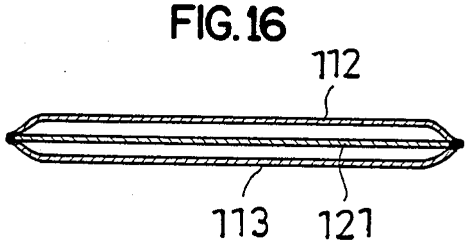
FIG. 16 is a cross-sectional view of FIG. 15.

FIGS. 15 and 16 show still another embodiment, wherein a central sheet (121) serving as such, not forming a bag, is covered front and back by a pocket forming sheet (118), i.e., a cover sheet member, whereby one side of the central sheet forms a primary storing chamber (150) and the other side a secondary storing chamber. In these figures, the left-hand side pocket strip (112) extends upward to be removably stuck to the right-hand surface of the central sheet (121). Also in this case, the central sheet (121) is of the same width as that of the sheet (118), and the two sheets are fused together along opposite widthwise lateral sides.

Figure 18:
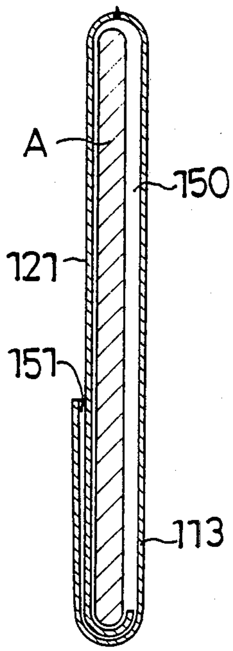
FIG. 18 is a longitudinal sectional view of a tenth embodiment.
Figure 17:
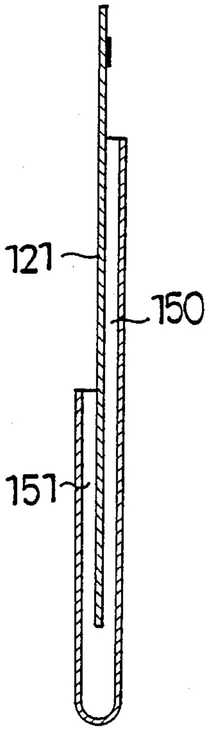
FIG. 17 is a longitudinal sectional view showing a ninth embodiment.

FIG. 17 shows a modification of the above embodiment, wherein the upper end of the central sheet (121) is adapted to be bent to the right to overlap the right-hand side of a primary storing chamber (150) to close the opening. In the case of FIG. 18, the other end of the central sheet is somewhat bent to the right while the right-hand side portion (113) of the pocket forming sheet extends upwardly to be fused to the upper end of the (150).

(INDUSTRIAL APPLICABILITY)

The present invention is useful for storing an article together with a description and a business card as when relatively inexpensive articles are offered free of charge for sales promotion to customers.

I claim:

1. A packaging bag comprising a central bag body formed of at least one plastic sheet, and a twofold cover sheet member of the same width as said central bag body and formed of a plastic sheet, wherein said cover sheet member is integrally formed of a first portion and a second portion, said first and second portions sandwiching said central bag body therebetween, the central bag body and the first and second portions of said cover sheet member being fused together along opposite widthwise lateral edges, said first portion of said cover sheet member and said bag body forming a front pocket having an upper open end and said second portion of said cover sheet member and said bag body forming a back pocket having an upper open end.

2. A packaging bag as set forth in claim 1, characterized in that said central bag body has a closed bottom.

3. A packaging bag as set forth in claim 1, characterized in that said central bag body has an open bottom.

4. A packaging bag as set forth in claim 1, characterized in that said central bag body has a closed upper end and a closed bottom.

* * * * *